Jan. 29, 1974   E. McKEOWN ET AL   3,789,040
PRODUCT FOR THE TREATMENT OF CELLULOSIC FABRICS
TO IMPROVE CREASE SUBSTANCE
Original Filed April 22, 1969

INVENTORS:

EAMON MCKEOWN,
JOHN LEONARD METCALF and
ARTHUR JAMES PRATT.

By
THEIR ATTORNEY

United States Patent Office

3,789,040
Patented Jan. 29, 1974

3,789,040
PRODUCT FOR THE TREATMENT OF CELLULOSIC FABRICS TO IMPROVE CREASE RESISTANCE
Eamon McKeown, Bromborough, John Leonard Metcalfe, West Kirby, and Arthur James Pratt, Bebington, England, assignors to Lever Brothers Company, New York, N.Y.
Continuation of abandoned application Ser. No. 818,318, Apr. 22, 1969. This application July 12, 1971, Ser. No. 162,005
Claims priority, application Great Britain, Apr. 26, 1968, 20,040/68
Int. Cl. C08b 25/02
U.S. Cl. 260—17.3
15 Claims

ABSTRACT OF THE DISCLOSURE

A substantially anhydrous composition for treating cellulosic fabric to improve its crease-resistance comprises a water-soluble resin precondensate, a latent-acid catalyst and a basic or amphoteric metal compound. The composition preferably takes tablet form and has a core comprising the latent-acid catalyst and a sheath comprising the resin precondensate.

---

This application is a continuation of Ser. No. 818,318 filed Apr. 22, 1969 and now abandoned.

The present invention is concerned with the treatment of cellulosic fabrics to improve their crease-resistance and smooth-drying properties. In the term "cellulosic fabrics," we include fabrics made from both natural cellulosic fibres, for example cotton, and from regenerated cellulosic fibres, for example viscose rayon, or from mixtures of any of such fibres with non-cellulosic fibres.

The crease-resistance of cellulosic fabrics is commonly improved by cross-linking the cellulose molecules within the fibres. Formaldehyde is an effective cross-linking agent but in commercial use has been superseded by other cross-linking agents such as resin precondensates of the urea-formaldehyde type. The cross-linking reaction is conducted under acidic conditions using a latent acid catalyst, which ideally only becomes strongly acidic on exposure to high temperatures so that it does not cause premature cross-linking when the cellulosic fabric is impregnated, or self-condensation of the resin-precondensate which is also caused by exposure to acidic conditions.

Cellulosic fabrics, particularly fabrics formed into garments, may thus be impregnated with aqueous solutions of resin-precondensates and latent-acid catalysts, partially dried and subsequently heated, for example by ironing, to cause the cross-linking to take place so that the fabric tends to retain the shape in which it was heated.

The latent-acid catalysts available are not sufficiently stable in admixture with resin precondensates to be added thereto much in advance of their use. It is conventional, therefore, to supply resin precondensates and latent-acid catalysts separately for commercial or domestic fabric treatment. Whereas this is no significant disadvantage commercially, where the facilities are available for making up large batches of suitable impregnating solutions, the necessary separation of the resin precondensates and the latent-acid catalysts until immediately prior to their use is a distinct disadvantage for the domestic application of crease-resistant finishes to cellulosic fabrics.

It is an object of the present invention to provide in a single product of improved stability during storage both a resin precondensate and a latent-acid catalyst for the treatment of cellulosic fabrics to improve their crease-resistance.

According to the present invention, a substantially anhydrous composition for treating a cellulosic fabric to improve its crease-resistance comprises (a) a water-soluble resin precondensate,
(b) a substantially anhydrous latent-acid catalyst and
(c) an oxide, hydroxide or carbonate of magnesium, aluminium, calcium, zinc or strontium.

Suitable water-soluble resin precondensates are commercially available and include melamine-formaldehyde, urea-formaldehyde and substituted urea-formaldehyde resin precondensates, for example, dimethylol urea (DMU), di-(methoxy methylol) urea (DMMU), dimethylol ethylene urea (DMEU), di-(methoxy methylol) ethylene urea (DMMEU), dimethylol propylene urea (DMPU), and di-(methoxy methylol) propylene urea (DMMPU). On economic grounds DMU and DMEU are the preferred resin precondensates, but the latter has the advantage of being more resistant to attack by chlorine, with resultant yellowing, if the treated fabric is subsequently bleached. These compounds are commercially available but are usually sold in aqueous solution. However, the compounds may readily be synthesized, for example DMU may be isolated as a solid by reaction between formaldehyde and urea, and DMEU may be made as a solid by reaction between ethylene urea and paraformaldehyde in methanol solution, followed by removal of the solvent.

It is desirable that the latent-acid catalysts should be substantially anhydrous, as otherwise the hygroscopic nature of the resin precondensates tends to remove the water of hydration from the catalysts and the products deteriorate as condensation of the resin precondensates takes place. Many suitable latent-acid catalysts are known and are commercially available. Latent-acid catalysts are usually inorganic salts, for example aluminium chloride, magnesium sulphate and perchlorate, zinc nitrate, ammonium chloride, sulphate, nitrate and tartrate. The term is also used to include weak organic acids, for example citric acid and tartaric acid, which do not cause any substantial premature cross-linking or resin precondensate polymerization but which are acidic enough during the conditions of curing to effect cross-linking to impart crease-resistance to treated fabric. The preferred latent-acid catalysts are ammonium salts, particularly ammonium chloride which can readily be obtained in anhydrous form.

The preferred metal oxides, hydroxides or carbonates are those of the metals from Group II of the Mendeleef Periodic Table, particularly magnesium, and less preferably calcium and zinc. The function of the basic or amphoteric metal compounds is to stabilize the compositions of the invention and for convenience the term "stabilizer" is used hereinafter to denote one or more of such compounds.

The stabilizer used in a composition according to the invention should not form a water-insoluble salt on reaction with the free acid liberated by the latent-acid used in the composition. The salt is either hydrolyzed in solution or is able to be hydrolyzed on heating to re-liberate the free acid. Thus, for example, zinc oxide cannot be used with ammonium chloride as the hydrogen chloride liberated by the latter reacts with the zinc oxide to give insoluble zinc oxychloride. Furthermore, it will be appreciated that some of the compounds have properties rendering their domestic use undesirable; for example some of the oxides and hydroxides are caustic or have high heats of hydration.

Taking all these factors into consideration magnesium oxide has been found to be the best stabilizer for use in compositions according to the invention. The salts formed by reaction between this compound and the acids liberated by the latent-acid catalysts used are themselves particularly efficient latent-acid catalysts; for example if the latent-acid is ammonium chloride the salt is magnesium chloride. This means that the ratio of the resin-precondensate to the latent-acid content of a composition will remain relatively constant despite some degree of decomposition of the latent-acid catalyst originally present in the composition.

In one embodiment, the composition of the invention is a substantially anhydrous powder or granular product formed by admixture of the essential ingredients, together with any desired additives. However, in a preferred embodiment of the invention the composition is in the form of discrete tablets. Such tablets may be homogeneous, that is to say the distribution of the resin precondensate, the latent-acid catalyst and the stabilizer is uniform throughout the product, or more preferably the tablets may be heterogeneously constructed. In an example of a preferred heterogeneous construction, each tablet has a core comprising the catalyst and the stabilizer surrounded by a sheath of a resin precondensate. This heterogeneous construction is advantageous as the more intimate contact between the latent-acid catalyst and the metal compound decreases the risk of any liberated free acid coming into contact with any resin precondensate and so causing condensation of the latter. Moreover, in tablets in which the liberation of any free acid would be accompanied by an increase in pressure, for example when the catalyst is ammonium chloride, the sheath of the resin precondensate would appear to tend by Le Chatelier's Principle to contain the internal pressure to the extent of inhibiting the reaction causing the acid liberation.

In alternative forms of heterogeneous tablet construction the stabilizer is mixed with the resin precondensate to form a sheath around a core of the latent-acid, or the stabilizer is formed as a sheath around a latent-acid core and is itself surrounded by an outer sheath of resin precondensate.

The use of tablets of the substantially anhydrous composition of the present invention is particularly beneficial for the domestic application of crease-resistant finishes to cellulosic fabrics in that the production of aqueous solutions of the desired concentration for any particular use is simplified.

A composition in tablet form according to the present invention is illustrated by way of example in the accompanying drawings of which.

Figure 1:
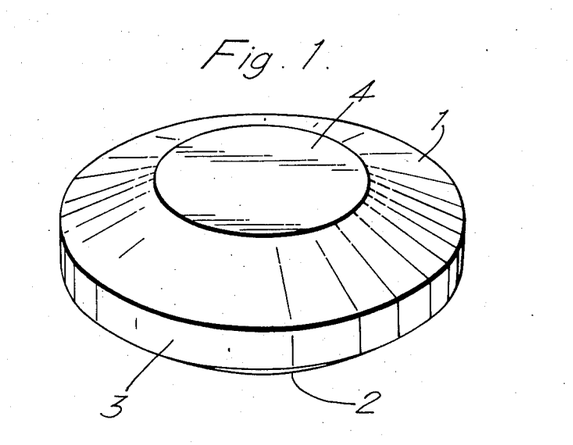
FIG. 1 is a perspective view of a tablet and
FIG. 2 is a diametric cross-sectional elevation of the tablet of FIG. 1.
Figure 2:
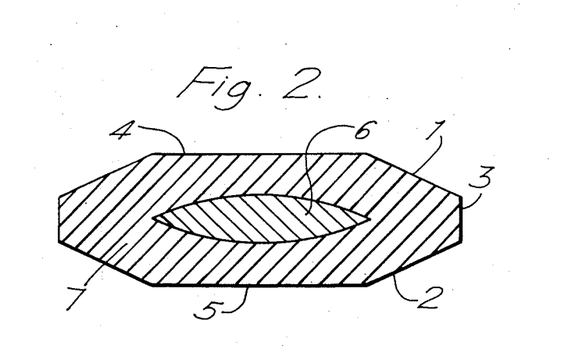

The external shape of the tablet in both figures is defined by two opposing truncated conical parts 1 and 2 connected between their bases by a cylindrical part 3 and having parallel flat ends 4 and 5, respectively.

The tablet in FIG. 2 is shown to be of two-part construction and has a discus-shaped core 6 of one material and a sheath 7 of a different material.

The tablets may be made by conventional compression moulding techniques. In so forming the tablets it is desirable to use pressures high enough to form cohesive tablets and yet not so high as to retard the solubilities of the tablets. The pressure used in forming the core need not be the same as that used in forming the outer sheath of tablets of two part construction. Generally, a stamping pressure within the range of from about 500 to 1,000 lbs. per sq. in. (about 35 to 70 kg. per sq. cm.), preferably about 800 lbs. per sq. in. (about 56 kg. per sq. cm.), is used for stamping the outer sheath, whilst higher pressures of from about 500 to 1,500 lbs. per sq. in. (35 to 105.5 kg. per sq. cm.) may satisfactorily be used to form cores of latent-acid catalysts. In the case of homogeneous tablets the stamping pressure should be in the same range as for the outer sheath of the two-part tablets.

The ratio of the resin precondensate to the latent-acid catalyst in a composition is important to the extent that there should be sufficient catalyst present to enable effective utilization of the resin precondensate in the cross-linking process. This is achieved in accordance with the present invention by providing in a single composition both a resin precondensate and a latent-acid catalyst, the ratio of which is chosen accurately and does not change substantially during storage of the composition.

The ratio of the amount of the resin precondensate to the total amount of the latent-acid catalyst plus the stabilizer is preferably about 5:1. More or less of the catalyst plus the stabilizer may be used in relation to the amount of the resin precondensate, if desired, though the amounts should generally be within the ratios of from 10:1 to 2:1.

The amount of the stabilizer used in relation to the amount of the latent-acid catalyst depends on the desired storage properties of the product and, to some extent, on the physical form of the product. Generally speaking, however, an amount of at least about 2 percent by weight of the metal compound on the amount of the latent-acid catalyst should be used, and preferably not less than about 10 percent by weight for optimum effect. Thus, if the ratio of the resin precondensate to the latent-acid catalyst plus the stabilizer is about 5:1, an amount of about 2 percent by weight of the metal compound is satisfactory. Higher amounts than these recommended levels may of course be used if desired and the lower amounts may still be satisfactory for particularly mild or short storage periods.

In addition to the essential ingredients of the compositions, namely the resin precondensates, the latent acid catalysts and the stabilizers, the compositions may optionally include minor amounts of solubilizing aids, for example cellulose or starch derivatives, which swell in the presence of water and so tend to disintegrate compositions in tablet form, surface-active agents and ironing aids, for example silicone oils.

The composition of the present invention may be used conveniently by dissolving an amount of it in water to form an aqueous solution of the desired concentration. Generally, a concentration of the resin precondensate in the solution within the range of from about 5 to about 15 percent by weight is satisfactory, but lower amounts of from 1 to 5 may be used successfully. The amount of the resin precondensate deposited on the cellulosic fabric treated depends on the concentration of the aqueous solution and also on the amount of the solution taken up by the fabric in the impregnation process. On average, the water take-up of cellulosic fabrics after wringing or otherwise removing excess solution is of the order of 100 percent by weight on the weight of the dry fabric, although by using efficient domestic spin-dryers the water take-up can be as low as 40 to 45 percent by weight and by using inefficient domestic mangles the water take-up might be as high as 150 percent by weight. After impregnation with the solution the cellulosic fabric is normally dried to some extent, though not completely, and the damp fabric is heated to cause the cross-linking reaction to take place. Usually the process is applied to cellulosic fabrics in garment form and in order to provide the garment with creases in the right places and not elsewhere, the garment should be pressed in the desired places when it is heated. In the commercial application of crease-resistant finishes, the whole garment may be pressed at one time but for their domestic application it is easier to heat the fabric locally using a domestic hand iron at a suitable temperature setting. Generally speaking, a curing temperature of at least 120° C. is desirable, but the temperature must not of course be so high as to damage the fabric.

Compositions embodying the present invention and their use are described in the following examples in which parts and percentages are by weight, unless otherwise stated.

EXAMPLE 1

A powder 1A was made by the addition of 550 g. (82%) of DMEU (particle size 16 mesh), 110 g. (16.36%) of ammonium chloride and 11 g. (1.64%) of magnesium oxide, with their subsequent admixture in a powder mill.

The resultant powder was stored in a sealed glass container and samples of it were withdrawn after storage for periods of 1 day, 7 days and 14 days for testing their properties. For purposes of comparison, a further powder 1B was made by an identical process as that for powder 1A, with the exception that it did not contain any magnesium oxide.

The tests conducted were as follows:

(i) Solubility (time taken to dissolve in stirred water at 18–20° C. to form a 5% solution, based on the resin precondensate content);
(ii) pH (of the 5% solutions formed in test (i));
(iii) Free formaldehyde (content of the 5% solutions formed in test (i), measured in mgms. $CH_2O$ per g. of resin precondensate);
(iv) Appearance and physical properties;
(v) Monsanto rating (In this test cotton fabrics were treated in the 5% solutions of test (i), cured and then washed in a domestic washing machine at 48° C. The Monsanto rating scale is a measure of the smooth-drying properties of the treated fabric and is expressed as a number up to 5, representing from very poor to excellent smooth-drying properties.)

It will be appreciated that all of these tests are relevant to the potential commercial utility of the compositions; the solubility measured in minutes should be low to facilitate the preparation of fabric treating solutions; the pH of the treated solution should be high to avoid tenderizing the fabric and prematurely polymerizing the resin precondensate; the free formaldehyde content should be as low as possible due to its smell and because it indicates premature reaction of the resin precondensate; the appearance should be unchanged with storage and the Monsanto rating should be as high as possible, preferably at least 4.0.

The results obtained in the tests were as shown in Table 1 below:

TABLE 1

| Test | Powder | 1 day | | 7 days | | 14 days | |
|---|---|---|---|---|---|---|---|
| (i) Solubility (mins.) | 1A | ¾ | | ¾ | | ½ | |
| | 1B | ½ | | 14 | | 15 | |
| | | After 1 hr. | After 24 hrs. | After 1 hr. | After 24 hrs. | After 1 hr. | After 24 hrs. |
| (ii) pH | 1A | 8.4 | 6.7 | 8.3 | 5.6 | 8.1 | 5.5 |
| | 1B | 6.3 | 4.6 | 1.7 | 1.7 | 1.8 | 1.9 |
| | | Immediately | After 24 hrs. | Immediately | After 24 hrs. | Immediately | After 24 hrs |
| (iii) Free formaldehyde | 1A | 12.9 | 17.4 | 15.3 | 26.4 | 9.6 | 24.6 |
| | 1B | 13.5 | 39.0 | 153.9 | 162.3 | 78.0 | 67.2 |
| (iv) Appearance | 1A | White, free-flowing powder | | | | | |
| | 1B | Yellowish, semi-solid | | Green, semi-molten | | | |
| (v) Monsanto rating | 1A | 4.5 | | 4.3 | | 4.4 | |
| | 1B | 4.9 | | Powder not usable | | | |

From the test results it can be seen that in every property determined after only 1 day and after prolonged storage, the powder 1A made according to the present invention is better than the comparative powder 1B.

EXAMPLE 2

A number of tablets 2A and 2B shaped as shown in FIG. 1 of the accompanying drawings were made by compression moulding from the powders 1A and 1B, respectively, of Example 1. The two types of tablets weighed 26.0 and 25.6 g., respectively, due to the additional presence in the former of the magnesium oxide. The tablets were tested by the same procedures as described in Example 1, with the results shown in Table II below:

TABLE II

| Test | Tablet | 1 day | | 7 days | | 14 days | |
|---|---|---|---|---|---|---|---|
| (i) Solubility (mins.) | 2A | 1½ | | 4 | | 5 | |
| | 2B | 1¼ | | 15 | | 15 ª | |
| | | After 1 hr. | After 24 hrs. | After 1 hr. | After 24 hrs. | After 1 hr. | After 24 hrs. |
| (ii) pH | 2A | 8.1 | 6.5 | 8.3 | 6.2 | 8.3 | 5.8 |
| | 2B | 6.6 | 4.6 | 2.1 | 2.1 | 1.9 | 1.9 |
| | | Immediately | After 24 hrs. | Immediately | After 24 hrs. | Immediately | After 24 hrs. |
| (iii) Free formaldehyde | 2A | 12.9 | 15.6 | 12.6 | 18.4 | 5.4 | 18.9 |
| | 2B | 14.4 | 34.5 | | 128.1 | 60.5 | 87.6 |
| (iv) Appearance | 2A | Tablets white and dry | | Tablets slightly off-white, dry | | Tablets off-white, fairly dry | |
| | 2B | Tablets white and dry | | Tablets yellowish and fused together | | Tablets green and semi-molten | |
| (v) Monsanto rating | 2A | 4.5 | | 4.0 | | 4.4 | |
| | 2B | 4.5 | | Tablets not usable | | | |

ª With some insoluble residue.

These results demonstrate the superiority of the tablets 2A, made according to the present invention, over the comparative tablets 2B; both of the tablets being better than the corresponding powders 1A and 1B, respectively.

EXAMPLE 3

Two further types of tablets 3A and 3B were made using the same proportions of ingredients as in the powders 1A and 1B, respectively, of Example 1. In each tablet 3A a core of compressed mixed ammonium chloride and magnesium oxide was surrounded by a sheath of compressed DMEU. Each tablet 3B was similarly constructed with the exception that the core contained only ammonium chloride. The shapes and constructions of the tablets 3A and 3B were as shown in FIGS. 1 and 2 of the accompanying drawings.

The tablets were tested in the same manner as the tablets of Example 2, with the results shown in Table III below:

The test results were as shown in Table IV below:

TABLE IV

| Tablet | Storage period (weeks) | Test applied | | |
|---|---|---|---|---|
| | | (i) Solubility (mins.) | (ii) pH | (v) Monsanto rating |
| 3A | 9 | 4 | 8.4 | 4.8 |
| 4 | 3 | 15 | 7.1 | 4.3 |
| 5 | 2½ | a 8½ | 7.2 | 4.3 |
| 6 | 9 | 3 | 8.0 | 4.7 |
| 7 | 9 | 3¾ | 8.0 | 4.6 |
| 8 | 9 | 3½ | 8.5 | 4.8 |
| 9 | 13 | 4 | 8.4 | 4.3 |
| 10 | 13 | 4 | 8.6 | 4.5 |
| 11 | 2 | 21 | 8.5 | 4.1 | a Small proportion insoluble.

TABLE III

| Test | Tablet | Storage period | | | | | |
|---|---|---|---|---|---|---|---|
| | | 1 day | | 7 days | | 14 days | |
| (i) Solubility (mins.) | 3A | 2 | | 5¼ | | 3¾ | |
| | 3B | 6 | | 25 | | 18 | |
| | | After 1 hr. | After 24 hrs. | After 1 hr. | After 24 hrs. | After 1 hr. | After 24 hrs. |
| (ii) pH | 3A | 8.4 | 5.5 | 8.2 | 6.7 | 8.3 | 5.5 |
| | 3B | 7.0 | 4.3 | 5.4 | 4.2 | 6.2 | 3.0 |
| | | Immediately | After 24 hrs. | Immediately | After 24 hrs. | Immediately | After 24 hrs. |
| (iii) Free formaldehyde | 3A | 10.5 | 24.3 | 14.4 | 17.4 | 14.1 | 28.5 |
| | 3B | 15.3 | 40.5 | 39.9 | 65.1 | 42.0 | 75.6 |
| (iv) Appearance | 3A | Tablets white and dry | | Tablets white and dry | | Tablets collapsed | |
| | 3B | | | Tablets yellowish and mushy | | | |
| (v) Monsanto rating | 3A | 4.4 | | 4.5 | | 4.4 | |
| | 3B | 4.4 | | 4.2 | | Tablets not usable | |

These results demonstrate the superiority of the tablets 3A made according to the present invention over the comparative tablets 3B, and also the benefit of the two-part construction for the tablets 3A over the homogeneous tablets 2A of Example 2.

EXAMPLES 4 TO 11

The tablets 3A were stored for a longer period and then their properties were again determined using the same tests (i), (ii) and (v) as in Example 3. A series of similarly constructed two-part tablets according to the invention were also made and tested, these other tablets having different resin precondensates and varying amounts of stabilizer as shown below:

| Tablet | Core | Sheath |
|---|---|---|
| 4 | Ammonium chloride with 2% of magnesium oxide. | DMEU |
| 5 | do | 50% DMEU/50% DMU |
| 6 | Ammonium chloride with 5% of magnesium oxide. | DMEU |
| 7 | do | 50% DMU/50% DMU |
| 8 | Ammonium chloride with 10% of magnesium oxide. | 50% DMU/50% DMU |
| 9 | Ammonium chloride with 13.4% of magnesium oxide. | DMEU |
| 10 | do | DMU |
| 11 | do | DMMU |

In all of the tablets the percentages of magnesium oxide were calculated on the ammonium chloride content.

Comparison of the results obtained for the various tablets demonstrates the desirability of having more than the minimum amount of 2% of magnesium oxide admixed with the ammonium chloride catalyst. However, there is little benefit in increasing the magnesium oxide content beyond 10% on the catalyst content. Although the tablet 11 is satisfactory as regards the Monsanto rating of the treated cloth, it has a lower solubility than the tablets comprising DMEU and DMU, the use of which is therefore to be preferred.

EXAMPLES 12 TO 18

In order to compare further the effect of using different resin precondensates in the compositions of the invention, some powders and tablets (constructed as in Example 3) were made as shown in Table V below, the catalyst and the stabilizer being in each example ammonium chloride and magnesium oxide respectively. The tablets each comprised 14.2 g. of resin precondensate, 2.85 g. of catalyst and 0.29 g. of stabilizer, whilst the powders comprised the mixed ingredients in the same ratios.

TABLE V

| Example | Resin precondensate | Physical form |
|---|---|---|
| 12 | DMU | Powder. |
| 13 | DMEU | Do. |
| 14 | DMMU | Do. |
| 15 | DMEU | Tablet. |
| 16 | DMPU | Do. |
| 17 | DMMEU | Do. |
| 18 | DMMPU | Do. |

The properties of these compositions were determined after periods of storage for 1 day, 7 days and 28 days, using the tests described in Example 1. The results are set out in Table VI below:

of tablets constructed as in Example 3; the exception was Example 25 which was in powder form. The amounts of

TABLE VI

| Test | Example | Storage period | | |
|---|---|---|---|---|
| | | 1 day | 7 days | 28 days |
| (i) Solubility (mins.) | 12 | 1¼ | 1¼ | 1½ |
| | 13 | ½ | ½ | ½ |
| | 14 | 1¾ | 2¼ | 1¾ |
| | 15 | ¾ | 1¼ | 2¼ |
| | 16 | 2½ | 3¼ | 4¾ |
| | 17 | 5½ | 5¾ | 7 |
| | 18 | 2¼ | 5¾ | 4 |

| Test | Example | After 1 hr. | After 25 hrs. | After 1 hr. | After 24 hrs. | After 1 hr. | After 24 hrs. |
|---|---|---|---|---|---|---|---|
| (ii) pH | 12 | 8.5 | 6.8 | 8.5 | 6.8 | 7.9 | 5.7 |
| | 13 | 8.6 | 5.6 | 8.4 | 5.5 | 8.1 | 5.3 |
| | 14 | 8.6 | 8.5 | 8.4 | 8.8 | 8.1 | 8.3 |
| | 15 | 8.6 | 5.7 | 8.2 | 5.4 | 7.4 | 5.4 |
| | 16 | 8.0 | 8.4 | 8.2 | 8.3 | 7.9 | 8.5 |
| | 17 | 8.2 | 8.4 | 8.5 | 8.7 | 8.4 | 8.5 |
| | 18 | 8.0 | 8.4 | 8.5 | 9.1 | 8.3 | 8.6 |

| Test | Example | After 1 hr. | After 25 hrs. | After 1 hr. | After 24 hrs. | After 1 hr. | After 24 hrs. |
|---|---|---|---|---|---|---|---|
| (iii) Free formaldehyde | 12 | 15 | 19 | 23 | 17 | 9 | 13 |
| | 13 | 17 | 20 | 21 | 26 | 11 | 19 |
| | 14 | 15 | 13 | 16 | 17 | 14 | 18 |
| | 15 | 18 | 26 | 12 | 27 | 14 | 27 |
| | 16 | 12 | 20 | 13 | 20 | 13 | 16 |
| | 17 | 12 | 24 | 16 | 15 | 10 | 17 |
| | 18 | 14 | 18 | 18 | 17 | 16 | 17 |

| Test | Example | | | |
|---|---|---|---|---|
| (iv) Appearance | 12 | White, free-flowing powder | | |
| | 13 | White, free-flowing powder | | |
| | 14 | White, free-flowing powder | | |
| | 15 | Tablets white and dry | | |
| | 16 | Tablets white and dry | | |
| | 17 | Tablets white and dry | | |
| | 18 | Tablets white and dry | | Tablets moist |

| Test | Example | 1 day | 7 days | 28 days |
|---|---|---|---|---|
| (v) Monsanto rating | 12 | 4.2 | 3.6 | 4.1 |
| | 13 | 3.6 | 3.8 | 4.0 |
| | 14 | 3.6 | 3.1 | 3.9 |
| | 15 | 4.8 | 4.3 | 4.5 |
| | 16 | 4.4 | 4.1 | 4.2 |
| | 17 | 4.0 | 4.0 | 4.1 |
| | 18 | 3.9 | 3.6 | 4.0 |

These results show that all of the resin precondensates can be used in compositions according to the invention, but that the materials DMMEU and DMMPU, used in Examples 17 and 18, are less satisfactory than the others, due in the case of the former to decreased solubility and in the latter to decreased stability of the tablets. This may be due to DMMEU and DMMPU being more hygroscopic than the other resin precondensates.

EXAMPLES 19 TO 25

To show the effect of using different latent acid catalysts and stabilizers, a series of compositions according to the invention were made as set out in Table VII below. In all but one of these examples the compositions took the form the ingredients were the same as in Examples 12 to 18, and in all examples the resin precondensate was DMEU.

TABLE VII

| Example | Catalyst | Stabilizer |
|---|---|---|
| 19 | Ammonium sulphate | Magnesium oxide. |
| 20 | Magnesium sulphate | Do. |
| 21 | Citric acid | Do. |
| 22 | Ammonium chloride | Magnesium carbonate. |
| 23 | do | Aluminium hydroxide. |
| 24 | Aluminium chloride | Calcium hydroxide. |
| 25 | Ammonium sulphate | Zinc oxide. |

Each of the compositions was tested after storage by the tests described with reference to Example 1, with the results set out in Table VII below:

TABLE VIII

| Test | Example | Storage period | | |
|---|---|---|---|---|
| | | 1 day | 7 days | 28 days |
| (i) Solubility (mins.) | 19 | ¾ | 1¼ | 1¼ |
| | 20 | 1¼ | 2 | 4¼ |
| | 21 | 1 | 1¾ | 6 |
| | 22 | 1½ | 1½ | 2½ |
| | 23 | 1 | 1½ | 9½ |
| | 24 | 2½ | 3 | 10 |
| | 25 | ½ | ½ | 2½ |

| Test | Example | After 1 hr. | After 24 hrs. | After 1 hr. | After 24 hrs. | After 1 hr. | After 24 hrs. |
|---|---|---|---|---|---|---|---|
| (ii) pH | 19 | 8.6 | 5.7 | 8.9 | 5.8 | 8.0 | 5.6 |
| | 20 | 9.5 | 9.7 | 9.3 | 5.1 | 9.8 | 10.0 |
| | 21 | 3.2 | 3.2 | 3.3 | 3.3 | 3.2 | 3.2 |
| | 22 | 8.1 | 5.4 | 8.0 | 5.3 | 8.0 | 5.2 |
| | 23 | 7.0 | 5.2 | 6.8 | 4.6 | 5.2 | 4.7 |
| | 24 | 8.2 | 5.1 | 7.5 | 5.0 | 6.9 | 5.2 |
| | 25 | 7.8 | 6.8 | 7.8 | 6.4 | 7.9 | 6.3 |

| Test | Example | After 1 hr. | After 24 hrs. | After 1 hr. | After 24 hrs. | After 1 hr. | After 24 hrs. |
|---|---|---|---|---|---|---|---|
| (iii) Free formaldehyde | 19 | 14 | 28 | 20 | 30 | 16 | 38 |
| | 20 | 6 | 21 | 5 | 17 | 13 | 26 |
| | 21 | 9 | 97 | 16 | 118 | 121 | 142 |
| | 22 | 21 | 30 | 23 | 33 | 14 | 31 |
| | 23 | 23 | 39 | 27 | 38 | 30 | 61 |
| | 24 | 14 | 33 | 15 | 29 | 24 | 42 |
| | 25 | 29 | 31 | 9 | 27 | 15 | 30 |

TABLE VIII—Continued

| Test | Example | Storage period | | |
|---|---|---|---|---|
| | | 1 day | 7 days | 28 days |
| (iv) Apearance | 19 | | Tablets white and dry | |
| | 20 | | Tablets whilte and dry | |
| | 21 | | Tablet soft | |
| | 22 | | Tablets white and dry | |
| | 23 | | Tablets white and dry | |
| | 24 | | Tablets white and dry | |
| | 25 | | Powder, white, lumpy | |
| (v) Monsanto rating | 19 | 4.4 | 4.0 | 4.0 |
| | 20 | 4.4 | 4.5 | 3.0 |
| | 21 | 4.3 | 4.2 | 4.2 |
| | 22 | 4.6 | 4.5 | 4.5 |
| | 23 | 4.5 | 4.4 | 4.4 |
| | 24 | 4.1 | 4.0 | 4.5 |
| | 25 | 4.3 | 4.3 | 4.5 |

These results demonstrate that a variety of catalysts and stabilizers can be used effectively in accordance with the invention. In respect of each of these examples a comparative composition was made which was similar in all respects except that it did not contain the stabilizer and in all cases the properties of the comparative compositions were much inferior to those of the examples.

With regard to these examples it is noted in particular that the use of citric acid in Example 21 tends to give tablets of inferior stability, but the Monsanto rating is high, although the pH and free formaldehyde test results are not as good as would be desired. The solubility of the citric acid tablets was lower than desired, as was the case with Examples 23 and 24 after 28 days storage.

EXAMPLES 26 AND 27

To show the effect of incorporating in compositions according to the invention additional ingredients to improve their solubilities and to facilitate the ease of ironing of cellulosc fabrics treated with solutions of the compositions, tablets were made from ingredients as shown in Table IX below:

TABLE IX

| Ingredient | Amount (g.) per tablet | |
|---|---|---|
| | Example 26 | Example 27 |
| Core: | | |
| Ammonium chloride | 5.0 | 5.0 |
| Wheat starch | 0.4 | 0.4 |
| Sodium lauryl sulphate | 0.1 | 0.1 |
| Sheath: | | |
| DMEU | 23.5 | 23.5 |
| Magnesium oxide | 0.5 | 0.1 |
| Silicone ironing aid [1] | | 1.0 |
| Sodium tripolyphosphate [2] | | 3.0 |

[1] Releasil 66, obtained from Midland Silicones Ltd.
[2] Used as carrier for the silicone oil emulsion.

The water solubilities and the Monsanto ratings of these examples were determined after storage under varied conditions of temperature and relative humidity and for different periods of time. The solubility was determined using in each case 500 g. of water at 18–20° C. with slow stirring. The results were as shown in Table X below:

TABLE X

| Storage conditions | Example | Test | Storage period | |
|---|---|---|---|---|
| | | | 36 days | 70 days |
| 37° C./0% R.H. | 26 | Solubility (secs.) | 110 | |
| | | Monsanto rating | 4.0 | |
| | 27 | Solubility (secs.) | | 150 |
| | | Monsanto rating | | 3.9 |
| 25° C./65% R.H. | 26 | Solubility (secs.) | 74 | |
| | | Monsanto rating | 3.7 | |
| | 27 | Solubility (secs.) | | 390 |
| | | Monsanto rating | | 3.6 |
| 25° C/0% R.H. | 26 | Solubility (sec.) | 65 | |
| | | Monsanto rating | 3.8 | |
| | 27 | Solubility (secs.) | | 105 |
| | | Monsanto rating | | 3.9 |

Apart from the poor solubility figure for the tablets of Example 27 after prolonged storage at 25° C. under conditions of high humidity, these examples had excellent properties.

All of the tablets in the examples were shaped externally as those shown in the figures, whilst the two-part tablets were constructed as shown in FIG. 2 of the accompanying drawing.

We claim:

1. A substantially anhydrous composition for treating a cellulosic fabric to improve its crease-resistance consisting essentially of:
   (a) a water-soluble cellulose cross-linking resin precondensate selected from the group consisting of melamine-formaldehyde, urea-formaldehyde, dimethylol urea, di-(methoxymethylol) urea, dimethylol ethylene urea, di-(methoxymethylol) ethylene urea, dimethylol propylene urea, and di-(methoxymethylol) propylene urea precondensates;
   (b) a latent acid catalyst selected from the group consisting of aluminum chloride, magnesium sulphate, magnesium perchlorate, zinc nitrate, ammonium chloride, ammonium sulphate, ammonium nitrate, ammonium tartrate, citric acid and tartaric acid; and
   (c) a stabilizer selected from the group consisting of the oxides, hydroxides, and carbonates of magnesium, aluminum, zinc, calcium, and strontium; the ratio of the amount of resin precondensate to the amount of latent acid catalyst plus stabilizer being about 10:1 to about 2:1 parts by weight, and the amount of stabilizer being present in an amount equal to at least about 2% by weight based upon the amount of catalyst, but not exceeding the amount which will render the catalyst ineffective to cure said precondensate.

2. A composition according to claim 1 wherein the resin precondensate is dimethylol ethylene urea.

3. A composition according to claim 1 wherein the latent acid catalyst is ammonium chloride.

4. A composition according to claim 1 wherein the stabilizer is selected from the group consisting of an oxide, hydroxide, and carbonate of magnesium, calcium and zinc.

5. A composition according to claim 1 wherein the stabilizer is magnesium oxide.

6. A composition according to claim 1 wherein the ratio of the amount of resin precondensate to the total amount of the latent acid catalyst plus the stabilizer is about 5:1.

7. A composition according to claim 1 consisting essentially of a substantially homogeneous mixture of the resin precondensate, the latent acid catalyst and the stabilizer.

8. A composition according to claim 1 consisting essentially of a core of mixed latent acid catalyst and stabilizer, and a sheath of resin precondensate.

9. A composition according to claim 1 consisting essentially of a core of latent acid catalyst, an inner sheath of stabilizer surrounding the core, and an outer sheath of resin precondensate.

10. A composition according to claim 1 consisting essentially of a core of latent acid catalyst and an outer sheath of mixed resin precondensate and stabilizer.

11. A composition according to claim 1 additionally comprising an ironing aid.

12. A composition according to claim 11 wherein the ironing aid is a silicone oil.

13. A composition according to claim 1 which further includes a minor amount of a compound selected from the group consisting of the derivatives of cellulose and starch.

14. A composition according to claim 1 wherein the stabilizer is selected from the group consisting of magnesium oxide, calcium oxide and zinc oxide and is present in about 10% by weight of the amount of the latent acid catalyst.

15. A composition according to claim 1 in tablet form.

References Cited

UNITED STATES PATENTS

| | | | |
|---|---|---|---|
| 3,138,565 | 6/1964 | Rosenberger et al. | 260—17.3 |
| 3,223,656 | 12/1965 | Frazier | 260—17.3 |
| 3,320,192 | 5/1967 | Ostrowicz | 260—17.3 |
| 3,248,255 | 4/1966 | Belasco et al. | 117—100 A |
| 1,536,253 | 5/1925 | Weber | 260—71 |
| 3,060,061 | 10/1962 | Loebler et al. | 117—139.4 |
| 3,054,699 | 9/1962 | Moyse | 117—139.4 |
| 3,457,199 | 7/1969 | Wells et al. | 260—71 |
| 3,140,197 | 7/1964 | Herberlein | 117—139.4 |
| 3,546,006 | 12/1970 | Verburg | 117—139.4 |

HAROLD D. ANDERSON, Primary Examiner

E. WOODBERRY, Assistant Examiner

U.S. Cl. X.R.

117—139.4, 139.5 A; 260—15, 69, 71

UNITED STATES PATENT OFFICE
CERTIFICATE OF CORRECTION

PO-1050
(5/69)

Patent No. 3,789,040                     Dated January 29, 1974

Inventor(s) Eamon McKeown et al.

It is certified that error appears in the above-identified patent and that said Letters Patent are hereby corrected as shown below:

Column 6, Table I - Please correct Table I to read as shown in the Annex hereto.
Column 7, Table III - Please correct Table III to read as shown in the Annex hereto
Column 7, Lines 65 and 66 "DMU" (2nd appearance) should in each instance be read --DMEU--
Column 9, Table VI - Please correct Table VI to read as shown in the Annex hereto.
Column 11, Table VIII-Continued - Please correct Table VIII to read as shown in the Annex hereto.

Signed and sealed this 10th day of September 1974.

(SEAL)
Attest:

McCOY M. GIBSON, JR.                    C. MARSHALL DANN
Attesting Officer                       Commissioner of Patents

TABLE I

| Test | Powder | Storage period | | | | | |
|---|---|---|---|---|---|---|---|
| | | 1 day | | 7 days | | 14 days | |
| (i) Solubility (mins.) | 1A | ¼ | | ¾ | | ½ | |
| | 1B | ½ | | 14 | | 15 | |
| | | After 1 hr. | After 24 hrs. | After 1 hr. | After 24 hrs. | After 1 hr. | After 24 hrs. |
| (ii) pH | 1A | 8.4 | 6.7 | 8.3 | 5.6 | 8.1 | 5.5 |
| | 1B | 6.3 | 4.6 | 1.7 | 1.7 | 1.8 | 1.9 |
| | | Immediately | After 24 hrs. | Immediately | After 24 hrs. | Immediately | After 24 hrs. |
| (iii) Free formaldehyde | 1A | 12.9 | 17.4 | 15.3 | 26.4 | 9.6 | 24.6 |
| | 1B | 13.5 | 30.0 | 133.9 | 162.3 | 78.0 | 67.2 |
| (iv) Appearance | 1A | ←———————————————— White, free-flowing powder ————————————————→ | | | | | |
| | 1B | Yellowish, semi-solid | | Green, semi-molten | | | |
| (v) Monsanto rating | 1A | 4.5 | | 4.3 | | 4.4 | |
| | 1B | 4.9 | | Powder not usable | | | |

TABLE III

| Test | Tablet | Storage period | | | | | |
|---|---|---|---|---|---|---|---|
| | | 1 day | | 7 days | | 14 days | |
| (i) Solubility (mins.) | 3A | 2 | | 5¼ | | 3½ | |
| | 3B | 6 | | 25 | | 18 | |
| | | After 1 hr. | After 24 hrs. | After 1 hr. | After 24 hrs. | After 1 hr. | After 24 hrs. |
| (ii) pH | 3A | 8.4 | 5.5 | 8.2 | 6.7 | 8.3 | 5.5 |
| | 3B | 7.0 | 4.3 | 5.4 | 4.2 | 6.2 | 2.0 |
| | | Immediately | After 24 hrs. | Immediately | After 24 hrs. | Immediately | After 24 hrs. |
| (iii) Free formaldehyde | 3A | 10.5 | 24.3 | 14.4 | 17.4 | 11.1 | 28.5 |
| | 3B | 15.3 | 40.5 | 30.9 | 65.1 | 42.0 | 75.6 |
| (iv) Appearance | 3A | ←———————————————— Tablets white and dry ————————————————→ | | | | | |
| | 3B | Tablets white and dry | | Tablets yellowish and mushy | | Tablets collapsed | |
| (v) Monsanto rating | 3A | 4.4 | | 4.5 | | 4.4 | |
| | 3B | 4.4 | | 4.2 | | Tablets not usable | |

TABLE VI

| Test | Example | Storage period | | |
|---|---|---|---|---|
| | | 1 day | 7 days | 28 days |
| (i) Solubility (mins.) | 12 | 1½ | 1½ | 1½ |
| | 13 | 1½ | 1½ | 1½ |
| | 14 | 1½ | 2½ | 2½ |
| | 15 | 3½ | 1½ | 4½ |
| | 16 | 2½ | 3½ | 4½ |
| | 17 | 5½ | 5½ | 7 |
| | 18 | 2½ | 5½ | 4 |

| Test | Example | After 1 hr. | After 24 hrs. | After 1 hr. | After 24 hrs. | After 1 hr. | After 24 hrs. |
|---|---|---|---|---|---|---|---|
| (ii) pH | 12 | 8.5 | 6.8 | 8.5 | 6.8 | 7.9 | 5.7 |
| | 13 | 8.6 | 5.6 | 8.4 | 5.5 | 8.1 | 5.3 |
| | 14 | 8.6 | 8.5 | 8.4 | 8.8 | 8.1 | 8.3 |
| | 15 | 8.6 | 5.7 | 8.2 | 5.4 | 7.4 | 8.4 |
| | 16 | 8.0 | 8.4 | 8.2 | 8.3 | 7.9 | 8.5 |
| | 17 | 8.2 | 8.4 | 8.5 | 8.7 | 8.4 | 8.5 |
| | 18 | 8.0 | 8.4 | 8.5 | 9.1 | 8.3 | 8.6 |
| (iii) Free formaldehyde | 12 | 15 | 19 | 23 | 17 | 9 | 13 |
| | 13 | 17 | 20 | 21 | 26 | 11 | 19 |
| | 14 | 15 | 13 | 16 | 17 | 14 | 18 |
| | 15 | 18 | 26 | 12 | 27 | 14 | 27 |
| | 16 | 12 | 20 | 13 | 20 | 13 | 16 |
| | 17 | 12 | 24 | 16 | 15 | 10 | 17 |
| | 18 | 14 | 18 | 18 | 17 | 16 | 17 |

| Test | Example | 1 day | 7 days | 28 days |
|---|---|---|---|---|
| (iv) Appearance | 12 | | White, free-flowing powder | White, free-flowing powder |
| | 13 | | | White, free-flowing powder |
| | 14 | | | |
| | 15 | | Tablets white and dry | Tablets white and dry |
| | 16 | | | Tablets white and dry |
| | 17 | | | Tablets white and dry |
| | 18 | | Tablets white and dry | Tablets moist |
| (v) Monsanto rating | 12 | 4.2 | 3.6 | 4.1 |
| | 13 | 3.6 | 3.8 | 4.0 |
| | 14 | 3.6 | 3.1 | 3.9 |
| | 15 | 4.8 | 4.3 | 4.5 |
| | 16 | 4.4 | 4.1 | 4.2 |
| | 17 | 4.0 | 4.0 | 4.1 |
| | 18 | 3.9 | 3.6 | 4.0 |

TABLE VIII—Continued

| Test | Example | Storage period | | |
|---|---|---|---|---|
| | | 1 day | 7 days | 28 days |
| (iv) Apearance | 19 | | | Tablets white and dry |
| | 20 | | | Tablets white and dry |
| | 21 | | | Tablet soft |
| | 22 | | | Tablets white and dry |
| | 23 | | | Tablets white and dry |
| | 24 | | | Tablets white and dry |
| | 25 | | | Powder, white, lumpy |
| (v) Monsanto rating | 19 | 4.4 | 4.0 | 4.0 |
| | 20 | 4.4 | 4.5 | 3.0 |
| | 21 | 4.3 | 4.2 | 4.2 |
| | 22 | 4.6 | 4.5 | 4.5 |
| | 23 | 4.5 | 4.4 | 4.4 |
| | 24 | 4.1 | 4.0 | 4.5 |
| | 25 | 4.3 | 4.3 | 4.5 |